Dec. 19, 1922.   1,438,984.
J. P. CORRIGAN.
MEANS FOR OPERATING EXPLOSIVE ENGINES BY HYDROGEN GAS.
FILED JAN. 14, 1921.   2 SHEETS—SHEET 1.
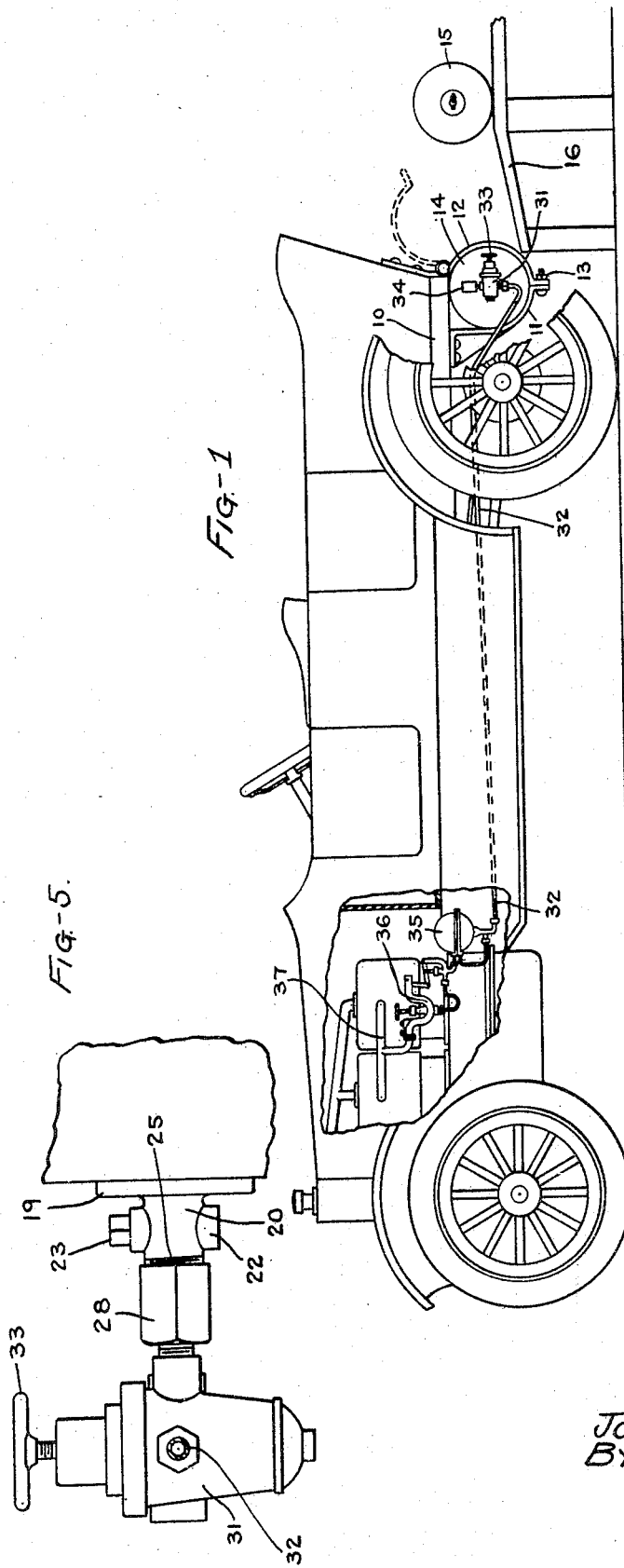
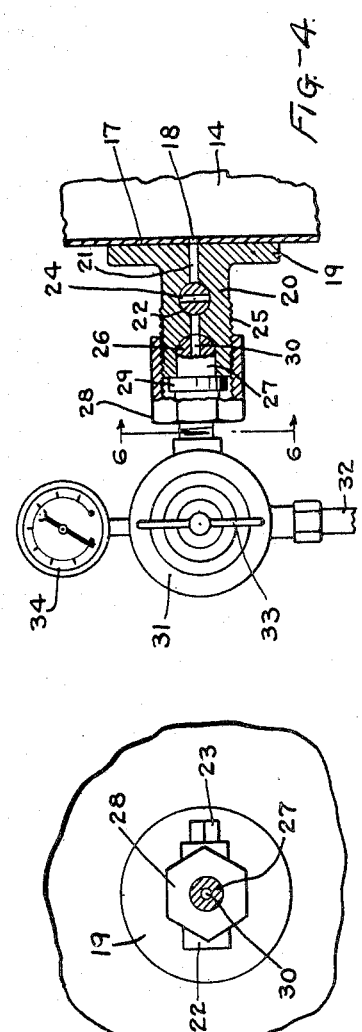
INVENTOR:
JOHN P. CORRIGAN.
BY
Whiteley and Ruckman
ATTORNEYS.

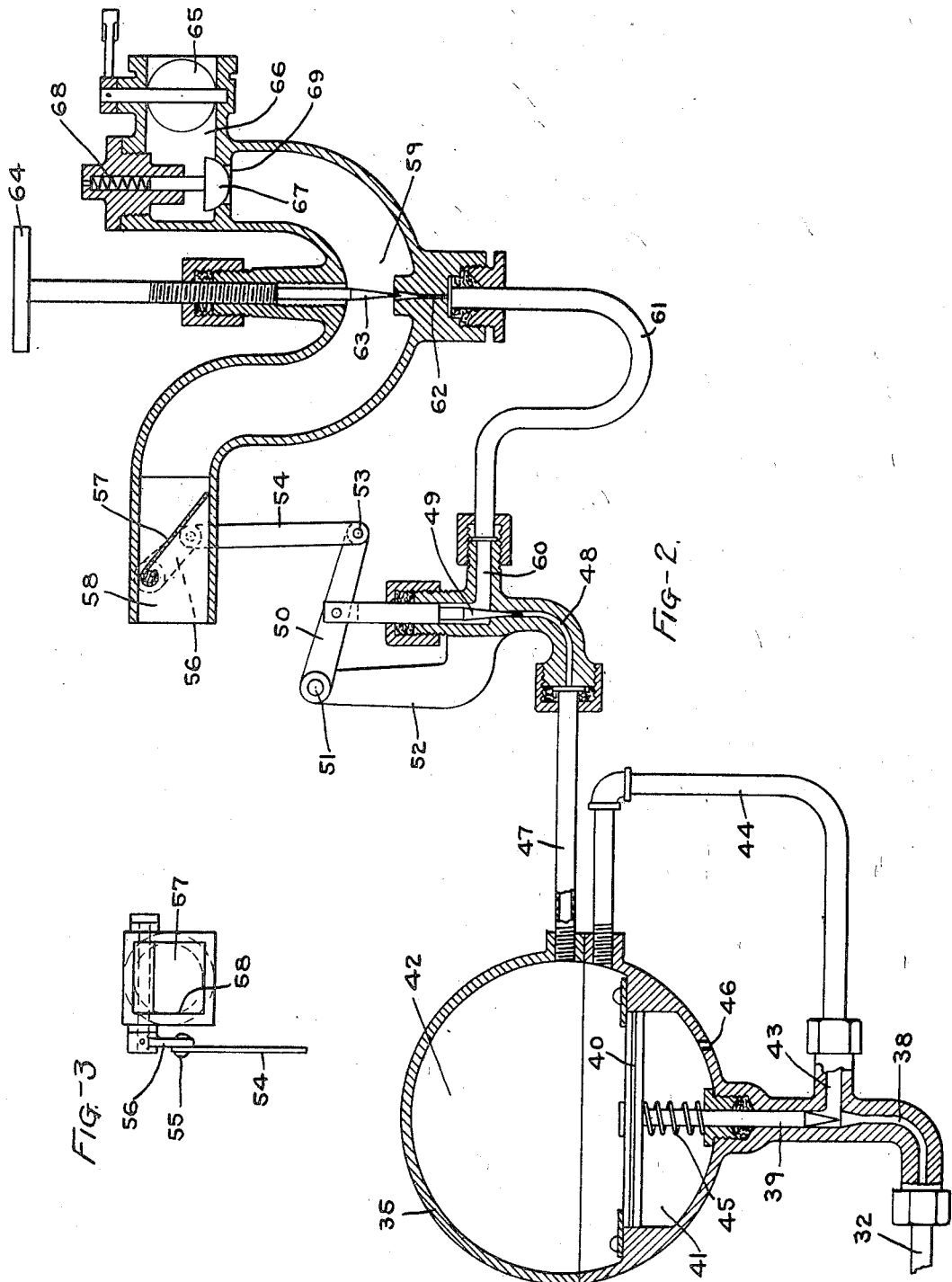

Patented Dec. 19, 1922.

1,438,984

UNITED STATES PATENT OFFICE.

JOHN P. CORRIGAN, OF MINNEAPOLIS, MINNESOTA.

MEANS FOR OPERATING EXPLOSIVE ENGINES BY HYDROGEN GAS.

Application filed January 14, 1921. Serial No. 437,216.

*To all whom it may concern:*

Be it known that I, JOHN P. CORRIGAN, a citizen of the United States, residing at Minneapolis, in the county of Hennepin and State of Minnesota, have invented certain new and useful Improvements in Means for Operating Explosive Engines by Hydrogen Gas, of which the following is a specification.

My invention relates to means for operating explosive engines by hydrogen gas, and has for its object to provide mechanism for conveying hydrogen gas from a high pressure tank through reducing means, and delivering the same to an air mixing device from which the mixture of hydrogen and air is conveyed to the cylinders of the engine in the usual way. My invention also includes specifically means for removably securing tanks of hydrogen upon the chassis of an automobile and connecting the same with pressure reducing and delivering means for conveying the gas to the mixer and thence to the engine.

It is a principal object of my invention to provide means for using hydrogen gas in the operation of explosive engines, particularly those employed in connection with automobiles in place of the fuel oils which are now customarily used. The desirability of such a use of hydrogen gas grows out of the fact that it may be manufactured very cheaply in the same process by which oxygen is made, and in fact is now a by-product of the manufacture of oxygen. Being in a very high degree compressible, large volumes of hydrogen can be stored in a tank which, including the stored hydrogen, will weigh but little more than a loaded fuel oil tank. The mixture of hydrogen and air is highly explosive, generating a high degree of heat and providing ample power. The use of hydrogen would, of course, necessitate the exchange of tanks for renewal of supply, the empty tank on the automobile or in connection with any stationary explosive engine being withdrawn and a filled tank substituted in its place, and the means shown for arranging for such exchange of tanks is particularly adapted to use in connection with automobiles.

The full objects and advantages of my invention will appear in connection with the detailed description thereof, and the novel features of the invention are more particularly pointed out in the claim.

In the drawings illustrating the application of my invention in one form,—

Fig. 1 is an elevation view of an automobile with some parts broken away showing my invention applied thereto. Fig. 2 is an enlarged sectional view of the feed mechanism. Fig. 3 is an end view of the air inlet valve and pipe. Fig. 4 is an end elevation partly in section on means for connecting the filled tanks of hydrogen with the distributing system. Fig. 5 is a plan view of the parts shown in Fig. 4. Fig. 6 is a sectional view on line 6—6 of Fig. 4.

As illustrated, the automobile chassis 10 is provided with a bracket 11 and a complemental hinged bracket member 12 adapted to be secured together at 13 and hold in position a tank 14 of hydrogen, which hydrogen will be compressed in the tank at from eighteen hundred to three thousand pounds per square inch or more as may be desired and expedient. When the tank 14 is emptied, it may be withdrawn and a filled tank, indicated at 15, supplied in the place thereof, preferably by rolling down an incline 16. Any other form of securing the tank to the automobile may be employed and fall within the scope of my invention, it being understood that it is essential in the normal practice of the invention that the tanks of hydrogen be interchangeable so that a charged tank may readily be substituted for one which is empty. This requires means for readily connecting and disconnecting the hydrogen tank to the gas delivering apparatus. As shown the end wall 17 of the tank 14 is perforated at 18, and secured, preferably by welding, to this end wall 17 is the flange base 19 of a casting 20 having a longitudinal aperture 21 registering with the perforation or opening 18 and adapted to be closed by a stem valve 22, which valve is provided with a squared head 23 whereby the valve 22 may be turned at will so that the aperture 24 therein may be brought into alinement with the bore or hole 21. The outside of the casting 20 is cylindrical and is threaded as indicated at 25, and the end of said cylindrical portion is provided with a semi-spherical socket 26 into which is adapted to be inserted a nipple 27, forming the connecting extension of the feed line appliances carried on the chassis 10 of the automobile. Surrounding an extension of the nipple member 27 is a nut 28 threaded on to the threaded portion 25 of the member 20. The nut 28 is a packing nut containing a desirable amount of packing in the head thereof which engages a flange 29 on the nipple 27, and not only holds the nipple 27 seated in the socket 26 but also produces a gas-tight closure. The nipple 27 is provided with an aperture 30 alined with the aperture 21 in the tubular member 20, by which the gas is connected through a pressure reducing mechanism 31 of any well known construction to the main feed pipe 32 extending from the rear of the automobile adjacent the support for tanks 14 to a point conveniently related to the engine at the front of the automobile. The reducing valve 31 is controlled by a hand screw 33, through which and in connection with a guage 34, the delivery pressure of the gas to the feed line 32 may be regulated as desired, preferably being reduced to about five pounds per square inch. From the pipe 32 the gas goes through another pressure reducing and feeding mechanism 35 from which it is conveyed to feeding mechanism indicated generally in Fig. 1 by the numeral 36 from which feeding mechanism the gas mixed with air goes to the inlet manifold 37 of the engine.

Referring to the specific and enlarged illustration of the feeding mechanism in Figs. 2 and 3, the gas passes from pipe 32 into a passageway 38 adapted to be closed or opened to any desired degree by a needle valve 39 rigidly mounted on a piston 40 slidable in a piston chamber 41 formed in conjunction with a semi-globular feeding chamber 42 comprising a portion of the reducing mechanism 35 heretofore referred to. By means of a passageway 43, the gas which passes through passageway 38 and past needle valve 39 is carried to a by-pass 44 from which it enters chamber 42 above the piston 40. A spring 45 surrounding the stem of needle valve 39 and adapted to be compressed by the movement of piston 40 toward the outer wall of the chamber 41 is of such strength in reference to the area of the piston, as to determine the delivery pressure of gas from the chamber 42, which will preferably be around two pounds per square inch. It will be apparent that when the pressure in chamber 42 exceeds the desired amount, the piston 40 will be pressed downward causing the needle valve 39 to close to a greater or less extent the opening from passageway 38, an air vent 46 from chamber 41 permitting free reaction of piston 40 to the pressure on its surface exposed within chamber 42 and against the pressure of spring 45.

From chamber 42, the gas passes through a pipe 47 to a passageway 48 in the operation controlled feeding device. This passageway 48 is controlled by a needle valve 49 pivotally connected with a link 50 which in turn is pivoted at 51 to a stand 52 and which has the free end pivoted at 53 to a link 54, which is pivotally connected at its end at 55 to an arm 56 upon which is a valve 57 extending across a main air inlet passageway 58, which air inlet passageway extends into a depressed mixing chamber 59. After passing the needle valve 49, the gas from passageway 48 goes through a passageway 60 and a U-pipe 61 from which it is delivered to a final feed passageway 62 adapted to be opened as desired by a needle valve 63 controlled by a hand screw or nut 64. The needle valve 63 determines the maximum flow of gas possible at a given pressure, and is adapted to avoid wastage of gas. An ordinary butterfly valve 65 is positioned to control the flow of gas mixture from the mixing chamber 59 through passageway 66 to the manifold 37.

The operation of my invention will be apparent from the foregoing description thereof. After the tank 14 has been positioned and connected with the feeding mechanism and reducing valve 31, the gas will flow at greatly reduced pressure (as stated around five pounds per square inch) to the feed reducing valve chamber 42 from which the piston 40 will determine the feed to the mixing chamber to be at a pressure of approximately two pounds per square inch. With the parts as shown in Fig. 2, chamber 42 will fill with gas at the desired pressure and flow of gas therefrom will be blocked by needle valve 49. In starting the engine, the air valve 57 will be lifted slightly by manual means not shown, thereby lifting needle valve 49 whereupon gas will flow into mixing chamber 59. As soon as the engine starts, the suction will still further lift air valve 57 and needle valve 49, and the gas will flow under its own pressure into mixing chamber 59 joining with the stream of air coming through air inlet 58. A mixing head 67 is provided at the upper end of mixing chamber 59 which is held by a spring 68 so as to lightly close an opening 69 from said mixing chamber to the passageway 66. The lifting of this valve by the air suction and its spring-floating engagement with the stream of gas (hydrogen and air) passing through the port 69 tends thoroughly to mix the hydrogen and air before the same passes through passageway 66 into the manifold.

It will be apparent from the foregoing description that the means herein described provide a simple and effective method of delivering a gas under pressure, such as hydrogen, directly from a pressure container into the engine-induced air current where the same will be mixed with a stream of air and caused to flow into the mixing chamber, and thence into the manifold. The flow of gas will continue without interruption from the tank until the pressure in the tank falls below the controlled delivery pressure, that is falls below five pounds per square inch when the tank will be for practical purposes empty, and it will be necessary to substitute therefor a filled tank. The means provided herein make it particularly simple and effective to make this substitution.

I claim:

In combination with an explosive engine, an air inlet associated therewith, means for permitting a current of air induced by the operation of the engine to enter said engine including a mixing chamber through which said air flows, a tank for supplying hydrogen under high pressure, a pipe for conducting gas from said tank, a pressure reducing device carried by said pipe, a casing constituting a feeding chamber, said pipe leading to a passageway associated with the wall of said casing, a by-pass pipe leading from said passageway to said feeding chamber, a needle valve in said passageway controlling the entrance into said by-pass pipe, a piston in said casing which separates said feeding chamber from an auxiliary chamber in said casing adjacent said passageway, said piston being secured to the stem of said needle valve, a spring positioned to resist the pressure exerted on said piston by the gas in said feeding chamber, a pipe leading from said feeding chamber, a valve casing to which said pipe is connected, a needle valve controlling a passageway through said valve casing, a link to which the stem of said needle valve is pivotally attached, a valve controlling the air inlet passageway into said aforementioned mixing chamber, a connection between said air controlling valve and said last mentioned needle valve whereby the two are caused to open and close in unison, a pipe leading from the passageway controlled by said last mentioned needle valve, said pipe leading into said mixing chamber through a passageway, an adjustable needle valve controlling said last mentioned passageway, a tubular connection between said mixing chamber and said engine, and means for controlling the passageway through said tubular connection.

In testimony whereof I hereunto affix my signature.

JOHN P. CORRIGAN.